United States Patent
Chauvel et al.

(10) Patent No.: US 7,565,385 B2
(45) Date of Patent: Jul. 21, 2009

(54) EMBEDDED GARBAGE COLLECTION

(75) Inventors: Gerard Chauvel, Antibes (FR); Serge Lasserre, Frejus (FR); Dominique D'Inverno, Villeneuve Loubet (FR); Maija Kuusela, Mouans Sartoux (FR); Gilbert Cabillic, Brece (FR); Jean-Philippe Lesot, Etrelles (FR); Michel Banâtre, La Fresnais (FR); Jean-Paul Routeau, Thorigné-Fouillard (FR); Salam Majoul, Rennes (FR); Frédéric Parain, Rennes (FR)

(73) Assignee: Texas Instruments Incorporated, Dallas, TX (US)

( * ) Notice: Subject to any disclaimer, the term of this patent is extended or adjusted under 35 U.S.C. 154(b) by 520 days.

(21) Appl. No.: 10/831,387

(22) Filed: Apr. 22, 2004

(65) Prior Publication Data

US 2004/0260732 A1    Dec. 23, 2004

(30) Foreign Application Priority Data

Jun. 19, 2003   (EP)   .................................. 03291506

(51) Int. Cl.
    *G06F 17/00*   (2006.01)
(52) U.S. Cl. ...................................................... 707/206
(58) Field of Classification Search ......... 707/200–202, 707/204, 205, 206
    See application file for complete search history.

(56) References Cited

U.S. PATENT DOCUMENTS

| | | | | |
|---|---|---|---|---|
| 5,991,779 A * | 11/1999 | Bejar | .......................... | 707/206 |
| 6,237,060 B1 * | 5/2001 | Shilts et al. | .................. | 711/100 |
| 6,542,911 B2 * | 4/2003 | Chakraborty et al. | ....... | 707/206 |
| 6,571,260 B1 * | 5/2003 | Morris | ........................ | 707/206 |
| 6,611,898 B1 * | 8/2003 | Slattery et al. | .............. | 711/118 |
| 6,629,113 B1 * | 9/2003 | Lawrence | .................... | 707/206 |
| 6,865,585 B1 * | 3/2005 | Dussud | ......................... | 707/206 |
| 2002/0056019 A1 * | 5/2002 | Kolodner et al. | ............... | 711/6 |
| 2002/0095453 A1 | 7/2002 | Steensgaard | | |
| 2003/0069905 A1 * | 4/2003 | Dussud | ......................... | 707/206 |
| 2004/0039759 A1 * | 2/2004 | Detlefs et al. | ................ | 707/206 |

OTHER PUBLICATIONS

"A Study of Garbage Collection API Adapted to Real-Time Environments", Toshinori Yasoshima, Online Article, Feb. 15, 2000, XP002265064, Retrieved from the Internet: URL:http://www.jaist.ac.jp/library/thesis/is-master-2000/paper/tyasosim/abstract.pdf Retrieved on Dec. 15, 2003.
"No Silver Bullet-Garbage Collection for Java in Embedded Systems", Alexandre Petit-Blanco, Online Article, Jan. 1, 1997, pp. 1-9, XP002265065, Retrieved from the Internet: URL:http://www.eg3.com/WebID/software/garbage/blank/paper/1-a-s.htm, Retrieved on Dec. 15, 2003.

* cited by examiner

*Primary Examiner*—Wilson Lee
(74) *Attorney, Agent, or Firm*—Lawrence J. Bassuk; W. James Brady; Frederick J. Telecky, Jr.

(57) ABSTRACT

An electronic system comprises a processor, memory coupled to the processor, and an application programming interface that causes an embedded garbage collection object to be active. The memory stores one or more objects that selectively have references from root objects. The embedded garbage collection object preferably uses control data to cause objects to be removed from said memory, the removed objects comprise those objects that were created while an embedded garbage collection object was active and that do not have references from root objects.

11 Claims, 4 Drawing Sheets

EMBEDDED GARBAGE COLLECTION

This application claims priority under 35 USC § (e)(1) of European Application Number 03291506.8, filed on Jun. 19, 2003.

BACKGROUND OF THE INVENTION

1. Technical Field of the Invention

The present invention relates generally to processors and more particularly to management of memory associated with processors.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

In some embodiments, an electronic system comprises a processor, memory coupled to the processor, and an application programming interface that causes an embedded garbage collection object to be active. The memory stores one or more objects that selectively have references from root objects. The embedded garbage collection object preferably uses control data to cause objects to be removed from said memory, the removed objects comprise those objects that were created while an embedded garbage collection object was active and that do not have references from root objects.

In other embodiments, a method comprises starting an embedded garbage collector, selecting an object to remove from memory, the memory including root objects that selectively may have references to associated objects and removing the selected object. Selecting the object to remove comprises identifying root objects whose context have changed and tracing the identified root objects to referenced objects to determine which objects are associated with a root object whose context has changed. Removing the selected object comprises removing an object that both was created while the embedded garbage collector was active and that was not determined as being associated with a root object whose context has changed.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

Figure 1:
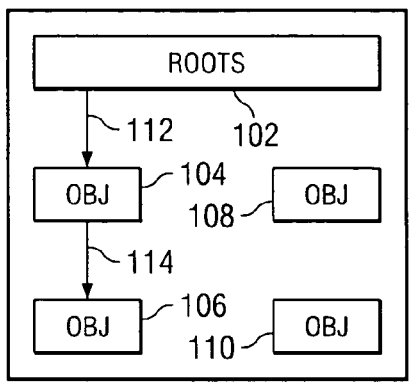
FIG. 1 shows an block diagram of an exemplary heap in an electronic system.

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor having memory in which computer programs associated with a stack-based language (e.g., Java) may be stored. The computer programs may be executed through a "virtual" machine that may be implemented in hardware, software, or both hardware and software. The virtual machine may transform the computer program into machine code (e.g., Java bytecodes) that may perform fundamental computer operations in a portion of memory referred to as a "stack". While being executed by the virtual machine. Java bytecodes may utilize the stack to store intermediate values.

In addition to the stack, a portion of memory may be reserved for storing Java objects (e.g., variables, classes, types). This portion of memory may be referred to as a "heap". When a Java object is created, the object is allocating memory in the heap. The size of the memory allocated in the heap may depend upon the type (e.g., int, long, array) of the Java fields included in the created object. A virtual machine may adjust the amount of memory reserved for the heap depending upon the percentage of the heap being utilized. For example, if the heap is over-utilized, the virtual machine reserves additional memory for the heap.

Objects stored in the heap may utilize other objects stored in the heap through a mechanism referred to as a "reference". For example, a first object may use a variable associated with a second object. Once loaded into the heap, the first object may create a reference to the second object. Once the reference between the objects has been created, the first object can access the variable associated with the second object. A set of all references associated with an object is referred to as the "context" for that object. References are inserted and modified through a "PutRef" operation that corresponds to every Java bytecodes that makes a write on a reference field or on an array element. As such, the context of a Java object may change only when a PutRef operation is issued on the object.

The size of the heap may be limited by the total amount of memory associated with a system. Once the heap reaches this maximum size and becomes fully utilized, no additional objects may be created. Once this state occurs, objects currently stored in the heap that may no longer be needed are taken out of the heap by a Java process to make room for other objects. The Java process that is responsible for removing objects from a heap may be referred to as a "garbage collection" process. Garbage represents the objects a garbage collection process selects to permanently remove from the heap. After a garbage collection process permanently removes objects from the heap, memory associated with these objects may be allocated for other objects.

A garbage collection process uses "roots" to identify objects that can be permanently removed from the heap. Although the user can assign roots, generally roots are automatically assigned by the underlying object runtime. This object runtime creates the first objects of the application, which are objects not necessary viewed by the application itself, or creates stacks (memory blocks) that contains references to objects, and assigned these object as roots.

After roots are identified and assigned, a garbage collection process may examine references from the roots to other objects. For example, FIG. 1 illustrates exemplary heap 100 containing roots 102 and objects 104, 106, 108, and 110. Although not explicitly shown, roots 102 may comprise any objects stored in the heap assigned as roots by a garbage collection process. Roots 102 may directly reference object 104 through reference 112. Object 104 may further reference object 106 through reference 114. When a garbage collection process is running on heap 100, all references from roots 102 may be followed by a procedure within the garbage collection process. The procedure of following references from a root object to other objects stored in a heap may be referred to as a "trace routine". For example, a trace routine on heap 100 may identify Java objects 104 and 106 as being accessible by roots 102. Based-upon the objects identified during the trace routine, a garbage collection process may determine which objects are to be removed from the heap. Objects identified in the tracing routine typically are not removed and objects not identified in the tracing routing are removed. Since the tracing routine starts from the roots, objects identified are called "reachable" objects from the roots and objects not identified are called "unreachable" objects. The rationale behind this removal technique considers objects not identified in the tracing routine as not necessary for the application running and thus may be removed. In the example of FIG. 1, objects 108 and 110 do not have references and thus will not be identified in the trace routine on heap 100. As such, a garbage collection process may remove these objects from the heap. The preferred embodiment of the invention may combine garbage collectors, such as that described above, with a preferred garbage collector described below.

The following describes the operation of the preferred embodiment of a system in which a garbage collection process may remove objects from the heap after the objects are used by a machine (e.g., processor, virtual machine). Other processor architectures and embodiments may be used and thus this disclosure and the claims that follow are not limited to any particular type of processor. Details regarding the garbage collection process follow the description of the processor and virtual machine.

The processor described herein is particularly suited for executing Java™ Bytecodes, or comparable code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims that follow.

Figure 2:
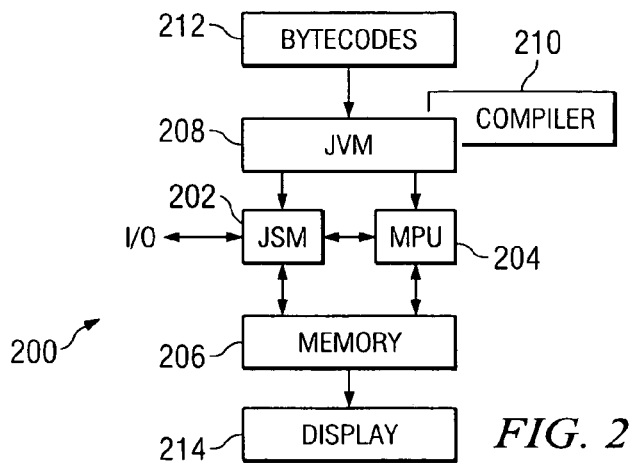
FIG. 2 shows a diagram of a system in accordance with preferred embodiments of the invention and including a Java Stack Machine ("JSM") and a Main Processor Unit ("MPU")

Referring now to FIG. 2, a system 200 is shown in accordance with a preferred embodiment of the invention. As shown, the system includes at least two processors 202 and 204. Processor 202 is referred to for purposes of this disclosure as a Java Stack Machine ("JSM") and processor 204 is referred to as a Main Processor Unit ("MPU"). System 200 may also include memory 206 coupled to both the JSM 202 and MPU 204 and thus accessible by both processors. At least a portion of the memory 206 may be shared by both processors meaning that both processors may access the same shared memory locations. Further, if desired, a portion of the memory 206 may be designated as private to one processor or the other. System 200 also includes a Java Virtual Machine ("JVM") 208, a compiler 210 and a display 214. The JSM 202 preferably includes an interface to one or more input/output ("I/O") devices such as a keypad to permit a user to control various aspects of the system 200. In addition, data streams may be received from the I/O space into the JSM 202 to be processed by the JSM 202. Other components (not specifically shown) may be included as desired.

Referring still to FIG. 2, as is generally known, Java code comprises a plurality of "Bytecodes" 212. Bytecodes 212 may be provided to the JVM 208, compiled by compiler 210 and provided to the JSM 202 and/or MPU 204 for execution therein. In accordance with a preferred embodiment of the invention, the JSM 202 may execute at least some, and generally most, of the Java Bytecodes. When appropriate, however, the JSM 202 may request the MPU 204 to execute one or more Java Bytecodes not executed or executable by the JSM 202. In addition to executing Java Bytecodes, the MPU 204 also may execute non-Java instructions. The MPU 204 also hosts an operating system ("O/S") (not specifically shown), which performs various functions including system memory management, the system task management that schedules the JVM 208 and most or all other native tasks running on the system, management of the display 214, receiving input from input devices, etc. Without limitation, Java code may be used to perform any one of a variety of applications including multimedia, games or web based applications in the system 200, while non-Java code, which may comprise the O/S and other native applications, may still run on the system on the MPU 204.

The JVM 208 generally comprises a combination of software and hardware. The software may include the compiler 210 and the hardware may include the JSM 202. The JVM may include a class loader, bytecode verifier, a general garbage collector that may be functionally separate from the preferred garbage collector described herein, and a bytecode interpreter loop to interpret the bytecodes that are not executed on the JSM processor 202.

In accordance with preferred embodiments of the invention, a garbage collection process may be embedded in a computer program through the use of an application programming interface (API). The API preferably includes a series of functions that program developers may execute to control garbage collection. Since the garbage collection process is instantiated within a program, the process runs in the same memory thread as the program executing this process. By running in the same memory thread, the embedded garbage collection process can effectively remove objects utilized by a particular program. This embedded garbage collection process may be herein referred to as an embedded garbage collector ("EGC").

The embedded garbage collector API (EGC-API) preferably includes three functions to control the operation of the EGC. A first function, which is the constructor function of an EGC object, instantiates the EGC in the heap and sets up data structures used by the EGC. A second function, "egc.start( )", sets the EGC to an "active" state. A third function, "egc.stop( )", preferably carries out the tracing routine, removes selected objects from the heap, and terminates an active EGC. The state of the EGC may be considered active anytime after the egc.start( ) function has been executed to the time the egc.stop( ) function has been executed. The egc.start( ) and egc.stop( ) are preferably within the same level of method call to remove. This may remove the need of analyzing the contents of the associated stack frame for references searching.

The EGC preferably considers for removal only objects that have been created in the heap while the EGC is active. Other garbage collectors, such that described above, may be used in combination with the EGC to remove objects from the heap not considered by the EGC. In addition, as opposed to automatically assigning the roots for the tracing routine, the EGC preferably allows a program developer to specify the roots using the constructor's parameters of the associated EGC.

Specified roots may be incorporated into the EGC by using a data structure referred to as a "root array". References to objects that define the roots for the tracing routine of the EGC may be included in the root array. For example, a developer may include a reference to a particular object in the root array. All references associated with this object may be identified during the tracing routine. The objects identified during the tracing routine preferably are not removed by the EGC. Other objects created while the EGC is active, in the current or in the previous activation, and not identified in the tracing routine preferably are removed. The capacity of the EGC to allow specification of root objects affords a program developer more control in the garbage collection process than with conventional garbage collectors.

Figure 3:
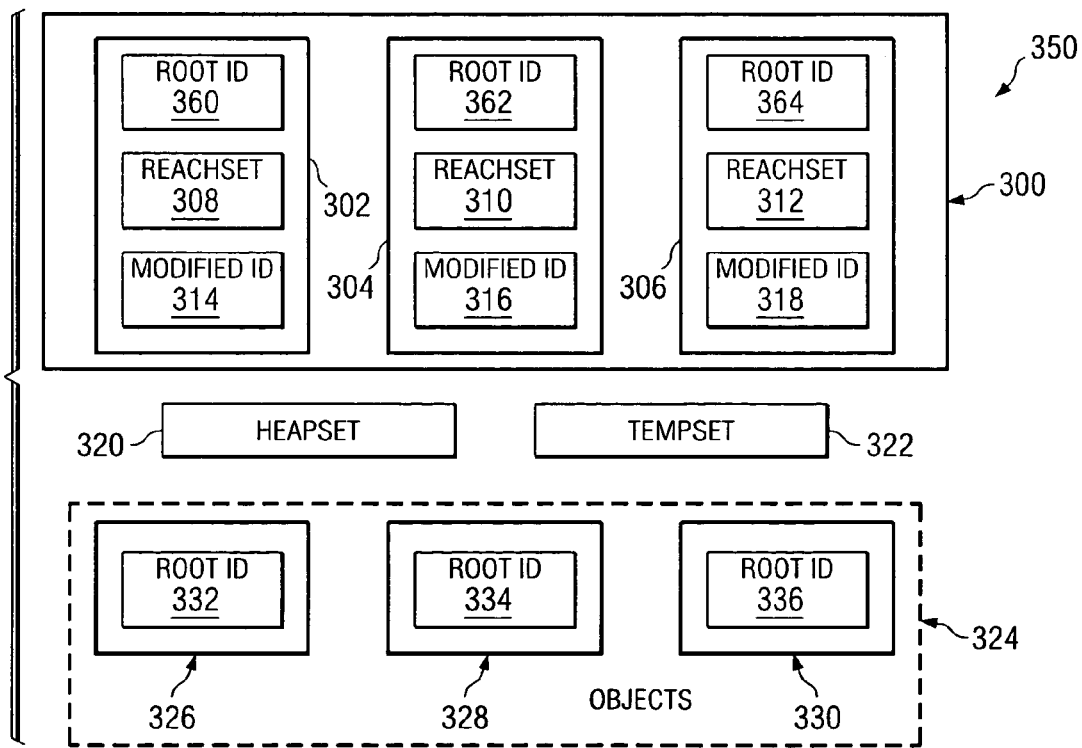
FIG. 3 shows a block diagram of a heap in accordance with a preferred embodiment of the invention and including data structures.

FIG. 3 illustrates an exemplary heap 350 for use with the EGC. Although a root array may contain references to any number of objects, in the example of FIG. 3 root array 300 comprises references to three root objects 302, 304, and 306. Each root object preferably comprises three associated data variables. The first data variable, referred to as a "reach set," may be used for placing references to objects that are identified during the tracing routine of the EGC. These references may comprise all objects stored in the heap that are referenced by a particular root object. Thus, the reach set variable of the root corresponds to the root context. Root objects 302, 304, and 306 may comprise reach sets 308, 310 and 312 as shown.

The second data variable is a status bit that may be associated with each root object to indicate whether the context of references, direct or transitive references, associated with the root object have been modified. This status bit may be referred to as a "modified" bit. For example, upon execution of the egc.start( ) function, the modified bits of the roots objects may be initially set to false. If during the active state of the ECG, a reference is modified, created, or deleted from an object of the current root context, the modified bit of that root object is set to true. As shown, root objects 302, 304, and 306 comprise modified bits 314, 316, and 318, respectively.

In accordance with the preferred embodiments of the invention, the modified bit may be modified automatically by the JVM 208. Each time a reference is created or modified, a "PutRef" instruction is issued to the JVM on an object. A modification of the PutRef instruction preferably is made to set the modified bit of a root object to true if a PutRef is done on an object which is inside a root context. To determine if an object is inside a root context, a third variable, referred to as a "root identifier" is described below.

Lastly, the third data variable in each root object is a root identifier. The root identifier stores a reference to the root object. Accordingly root objects 302, 304, and 306 contain root identifiers 360, 362, and 364.

Referring still to FIG. 3, two variable arrays may be used in combination with the EGC. The first array 320, referred to as the "heapset," preferably is used to store references to objects in the heap that are inside an EGC root context before and after the EGC is active. For example, the heapset 320 may contain objects that are in the heap before the EGC is started. The second array 322, referred to the "tempset," preferably is used to store the references of objects created in the heap while the ECG is active. Heap 350 also may comprise heap objects 324. Although any number of object may be in the heap at any given time, in the example of FIG. 3, heap objects 324 comprises three objects 326, 328, 330 as shown. Associated with each object 326, 328, 330 is a root identifier 332, 334, and 336. Similar to the root identifier in the root objects, the root identifier is set to NULL when creating the object. The root identifier of a heap object preferably stores a reference to the root object that references the heap object. For example, an object may be created and inserted into the context of a root object while the EGC is active. The root identifier associated with this newly created object may contain a reference to the root object that references the object. The EGC algorithm is in charge of setting the root identifier of objects in the heap during the tracing routine to detect which roots will have their context changed.

In accordance with preferred embodiments, the root identifier may be created automatically by a JVM 208. Each time an object is created in the heap, a "new" instruction is issued to the JVM. The "new" instruction preferably creates the object and stores the object on the heap. A modification of the "new" instruction preferably may be made to associate a root identifier to each new object created while the EGC is active. Initially the root identifier may be set to a NULL value.

An exemplary heap that uses the EGC will now be discussed with reference to FIGS. 4-8. Five stages of execution will be shown to illustrate the functionality of the EGC. These five stages are used solely to explain the operation of the EGC. The actual operation of the EGC may use any desired number of stages. The first stage (FIG. 4) shows the state of the heap and associated data structures during the execution of the egc.start( ) function. The second stage (FIG. 5) shows the state of the heap and associated data structures while the EGC is active and a new object is created in the heap. The third stage (FIG. 6) shows the state of the heap and associated data structures while the EGC is active and the context of root objects has been modified. The fourth stage (FIG. 7) shows the state of the heap and associated data structures during the execution of the egc.stop( ) function. Lastly, the fifth stage (FIG. 8) shows the state of the heap and associated data structures after the execution of the egc.stop( ) function.

Figure 4:
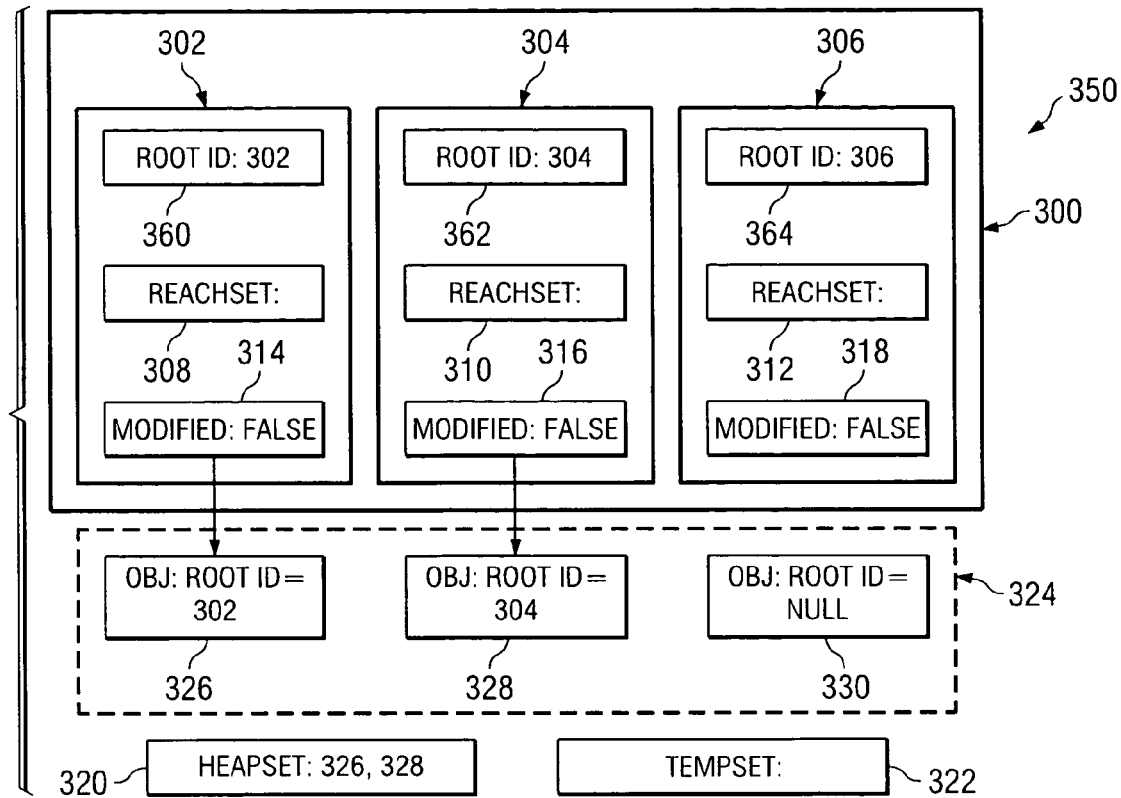
FIG. 4 depicts a block diagram of a heap in accordance with a preferred embodiment of the invention during the first stage of garbage execution.

Referring now to FIG. 4, heap 350 may be illustrated at the first stage of execution. Although any number of root objects may be included in the root array, three root objects 302, 304, and 306 are shown to facilitate discussion. These objects are placed into the root array 300 by the program developer. Modified bits 314, 316, and 318 are initially set to false during the egc.start( ) call. As explained above, the modified bits associated with a root object are set to true when a PutRef operation is performed on an object, which root identifier is not NULL.

The heapset data structure contains references to objects that were left on the heap by a previous instance of the EGC and that are inside a root context. For exemplary purposes, heapset 320 may contain references to two such objects 326 and 328. Object 326 is inside the root context of root 302 (a reference exists between the root 302 and object 326) and object 328 is inside the root context of root 304 (a reference exists between the root 304 and object 328). Correspondingly, objects 326 and 328 have root identifiers set to 302 and 304 respectively. The root identifiers are set during the initial egc.start( ) call and during every egc.stop( ) call. Reachsets 308, 310, and 312 as well as tempset 322 are empty at the first stage of execution. Since object 330 was not created while the EGC was active, it is not included in heapset 320 and will not be considered for removal by EGC.

Figure 5:
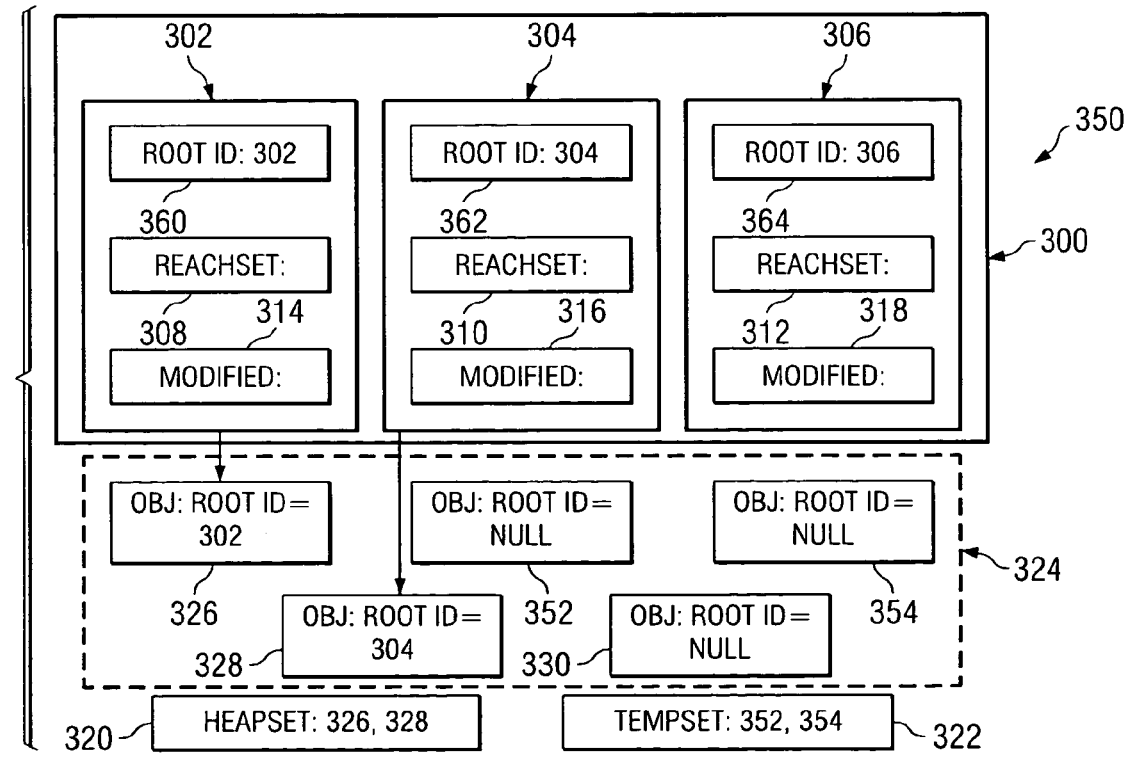
FIG. 5 depicts a block diagram of a heap in accordance with a preferred embodiment of the invention during the second stage of garbage execution.

FIG. 5 illustrates heap 350 at the second stage of execution (object creation in the heap). Although any number of objects may be created at this stage, two such objects 352 and 354 are shown to facilitate discussion. Objects 352 and 354 are created while the EGC is active. Accordingly, references to objects 352 and 354 are placed into tempset 322. In addition, the root identifiers of these objects are set to 'Null'. All other data structures remain unchanged at the second stage of execution.

Figure 6:
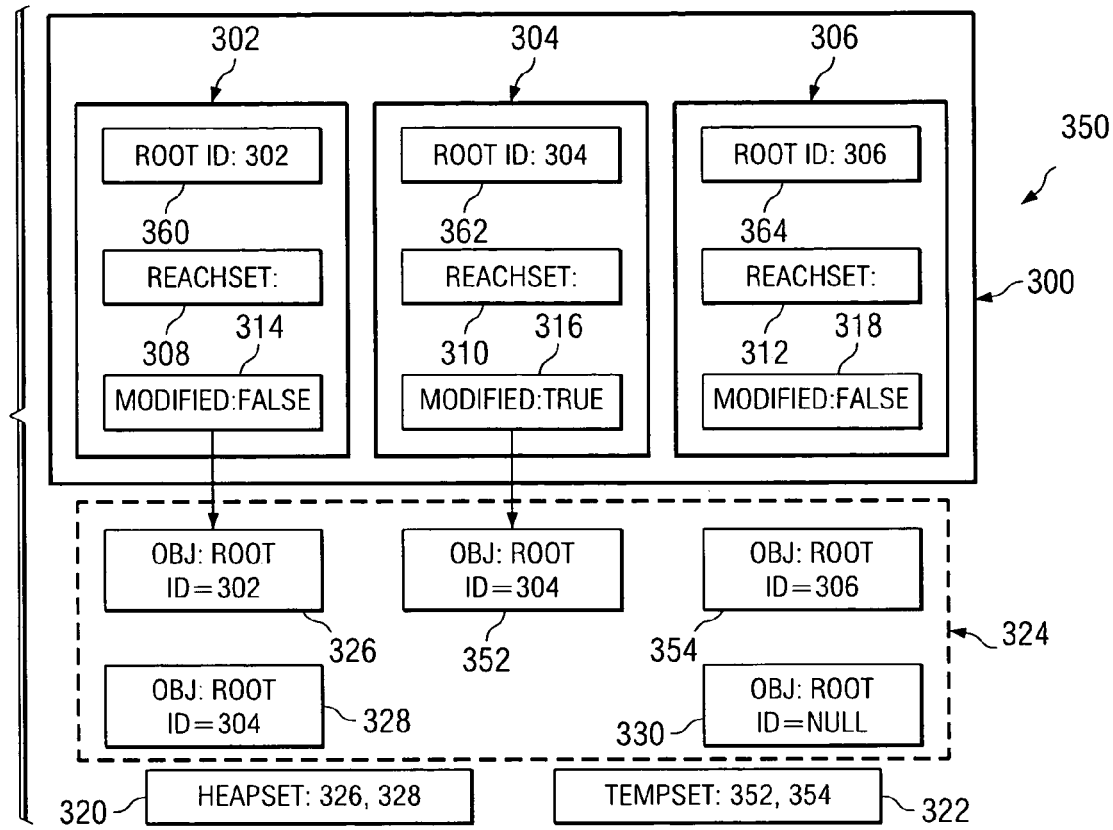
FIG. 6 depicts a block diagram of a heap in accordance with a preferred embodiment of the invention during the third stage of garbage execution.

Referring now to FIG. 6, exemplary heap 350 is illustrated at the third stage of execution (object context modification). For exemplary purpose, the reference of root object 304 changes from object 328 to object 352 (using a putref based opcode). When realizing a putref opcode on an object, the runtime uses the root identifier of that object to set the modified bit of the corresponding root object to true. On FIG. 6 the putref is executed on object 304 and the associated root identifier 362 is equal to object 304 because the object 304 is itself a root. Thus, the modified bit of root object 304 is set to true. All other data structures remain unchanged at the second stage of execution.

Figure 7:
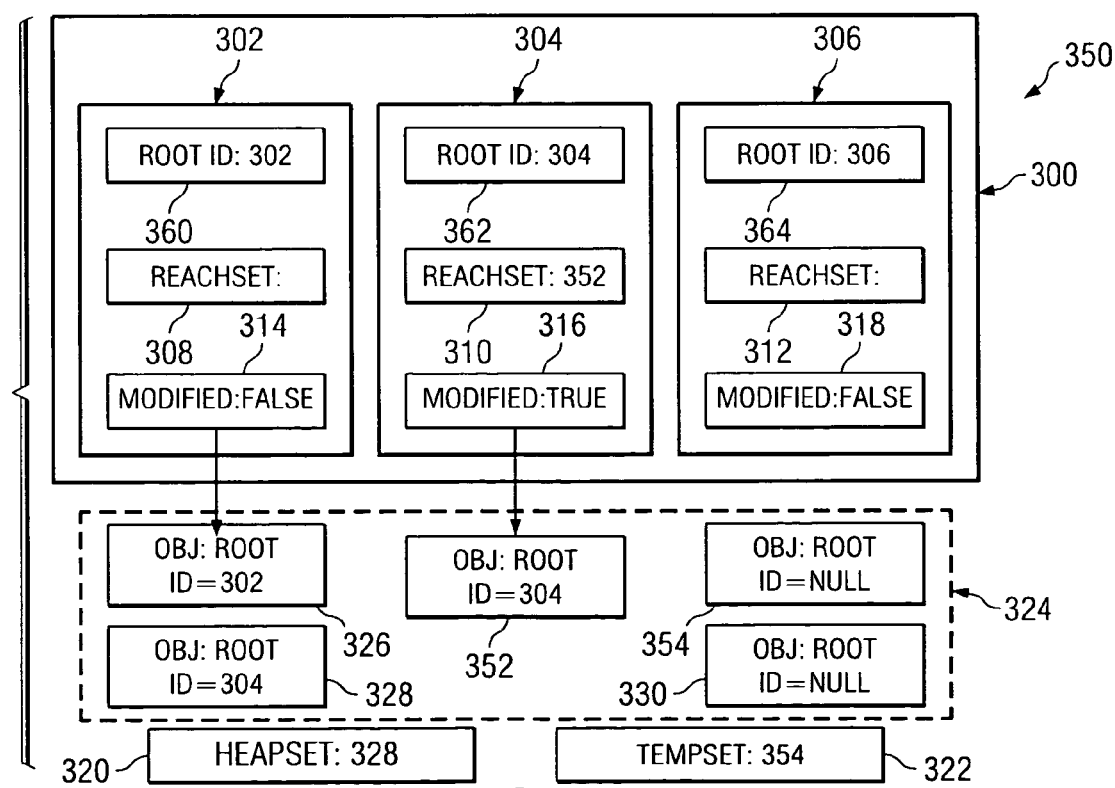
FIG. 7 depicts a block diagram of a heap in accordance with a preferred embodiment of the invention during the fourth stage of garbage execution.

FIG. 7 illustrates the heap 350 at the fourth stage of execution (egc.stop). During this stage, several steps are made. In the first step, a tracing routine is employed upon each root object that has its modified bit set to true, and only these roots. The tracing routine may identify all objects in the heap that are referenced by this root object. All objects identified during the tracing routine for a particular root object may be placed into the reachset associated with the respective root object. For example, since the modified bit associated with root object 304 is set to true, a tracing routine on root object 304 is employed. Object 352 will be identified in the tracing routine and placed into the reachset 310. Preferably, an object is included in only one set (reachset, heapset, tempset) at a time. Thus, the reference to object 352 is removed from tempset 322. In the second step after a tracing has been done from all roots marked as modified, all objects still present in the tempest 322 can be removed from memory. In the exemplary case, object 354 will be removed. The third step of the algorithm scans the heapset to determine if an object has been removed from a root context. The third step is carried out only if there is a root object that has its modified bit set to true. When scanning the heapset if an object has its Root identifier changed, it can be removed from memory. For example, object 328 is in the heapset during this stage of execution. Since object 328 has its root identifier referencing a root object that has had it context modified, object 328 can be removed from the heap by the EGC. The other object in the heapset, object 326 (FIG. 6), is not removed because its root identifier references root object 302 and root object 302 has not had its context modified. The fourth step during this stage of execution consists of building the heapset of the EGC. In order to build the heapset, every reachset of a root object that has its modified bit set to true is merged inside the heapset. The reachsets of the root object therefore becomes empty.

Figure 8:
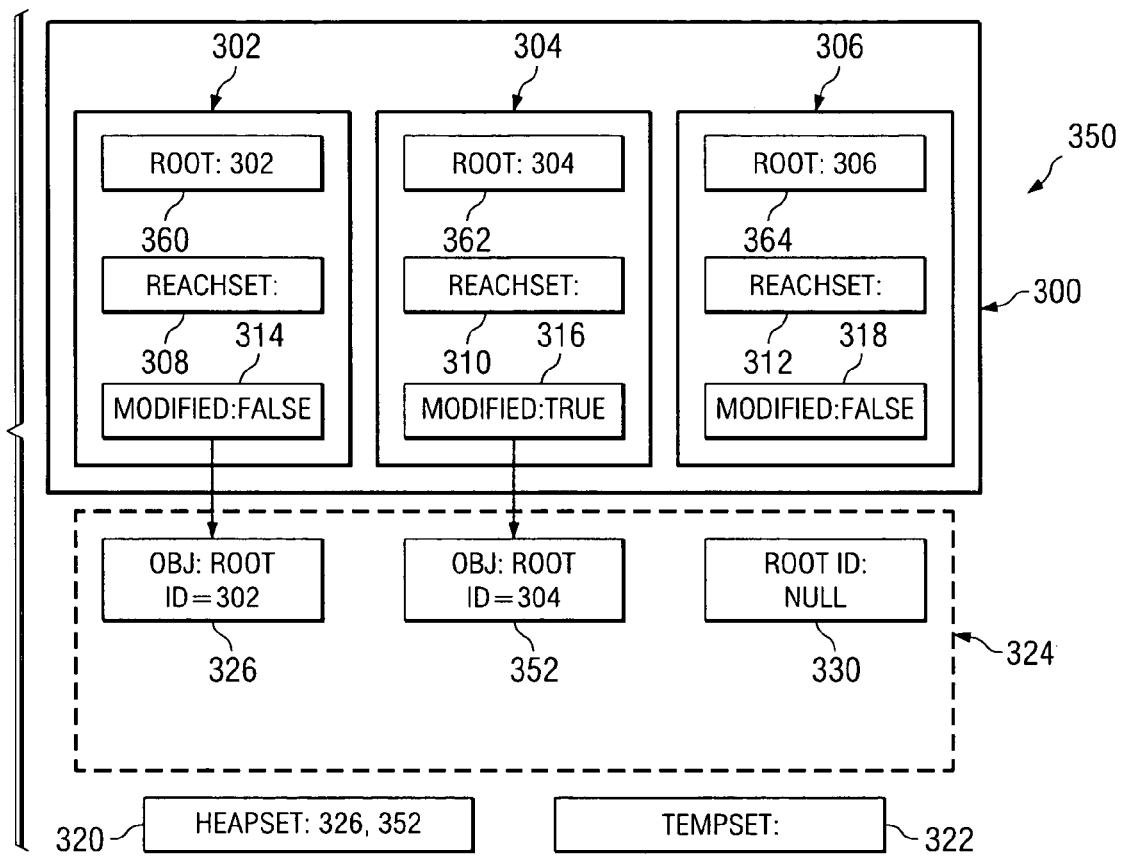
FIG. 8 depicts a block diagram of a heap in accordance with a preferred embodiment of the invention during the fifth stage of garbage execution.

Lastly, FIG. 8 may illustrate heap 350 at the fifth stage of execution. Root objects preferably are cleared from the root array 300. All objects in the heapset remain in heap 350. Since object 330 was not created while any previous instance of the EGC was active, object 330 also remains in heap 350. All other objects are removed from heap 350. All data structures are now in their initial state, allowing the EGC to be activated again when the egc.start( ) is executed.

Numerous variations and modifications will become apparent to those skilled in the art once the above disclosure is fully appreciated. It is intended that the following claims be interpreted to embrace all such variations and modifications

What is claimed is:

1. An electronic system, comprising:
   a processor;
   memory coupled to the processor, the memory storing one or more objects that have references from root objects; and
   an application programming interface that controls a state of an embedded garbage collection object;
   wherein the application programming interface is called from a program, the embedded garbage collection object instantiated within the program and operating in the same memory thread as the program while the program operates, the embedded garbage collection object uses control data to cause objects to be removed from said memory, the removed objects comprise those objects that were created while an embedded garbage collection object was in an active state and that do not have references from root objects.

2. The system of claim 1 wherein said state of an embedded garbage collector comprises initialized, active, or inactive.

3. The system of claim 2 wherein the control data comprises a modified bit associated with each root object, the modified bit indicates whether a context of the root object has been modified while the embedded garbage collector is in an active state, and a tempset, the tempset indicates the objects created while an embedded garbage collection object is in an active state and have not been referenced by a root object.

4. The system of claim 3 wherein the modified bit associated with a root object is set to true when the context of the root object has been changed.

5. The system of claim 3 wherein the modification of the root object's context included adding, changing, or removing a reference in the root object's context.

6. The system of claim 3 wherein the embedded garbage collection object traces root objects that have had their context changed and does not trace those root objects that have not had their context changed.

7. The system of claim 3 wherein objects to be removed from said memory further comprise objects allocated when the embedded garbage collection object is in an active state and still included in the tempset after all modified roots have been traced.

8. The system of claim 3 wherein the root objects are created by the program calling the application programming interface and passed to the embedded garbage collection object.

9. The system of claim 3 further comprising an additional garbage collection for objects that are not created while the embedded garbage collector is in an active state.

10. The system of claim 1 wherein the program controls the instantiation of the embedded garbage collection object.

11. The system of claim 1 wherein the application programming interface is used by the program to control the state of the embedded garbage collection object.

* * * * *